March 10, 1959  S. ALVINE, JR  2,877,435
MINIATURE BRUSH BLOCK FOR SLIP-RINGS
Filed March 17, 1955  3 Sheets-Sheet 1

INVENTOR.
SAMUEL ALVINE, JR.
BY
ATTORNEY

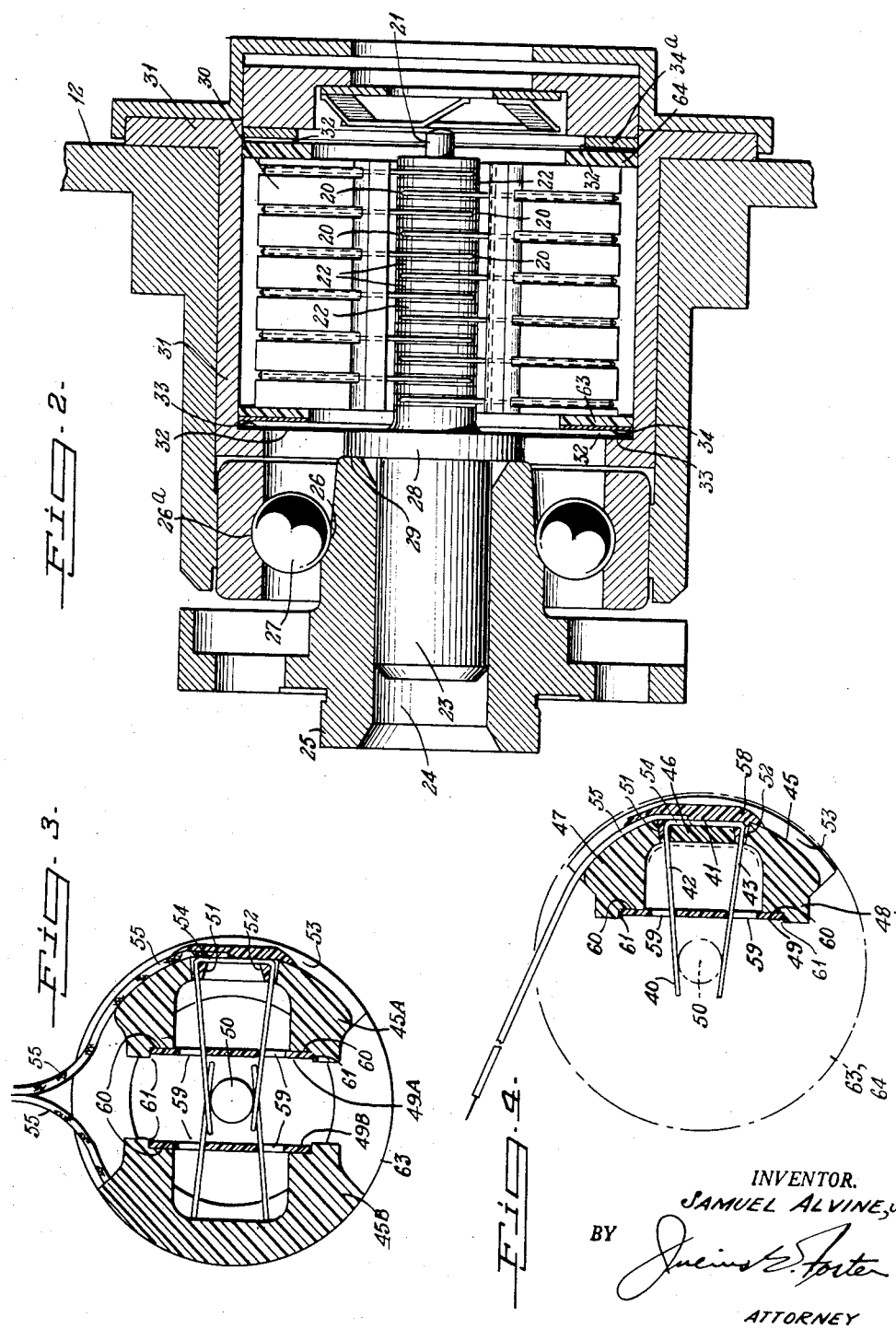

March 10, 1959  S. ALVINE, JR  2,877,435
MINIATURE BRUSH BLOCK FOR SLIP-RINGS
Filed March 17, 1955  3 Sheets-Sheet 3

INVENTOR.
SAMUEL ALVINE, Jr.
BY
ATTORNEY

United States Patent Office 2,877,435
Patented Mar. 10, 1959

2,877,435

MINIATURE BRUSH BLOCK FOR SLIP-RINGS

Samuel Alvine, Jr., Bloomfield, N. J., assignor to Kearfott Company, Inc., Little Falls, N. J., a corporation of New York Application March 17, 1955, Serial No. 495,006

8 Claims. (Cl. 339—5)

This invention relates to brush and slip-ring assemblies, and particularly to miniaturized assemblies suitable for general application, and particularly for application in gimbal mountings for gyroscopes.

In gyroscopes used as precision instruments to provide indicating or control functions, as on airplanes, it is essential, in the interest of accuracy of operation of the gyro, to reduce all friction forces to a minimum, where those forces might have some effect in modifying the proper operation of the gyro.

The present day conventional instrument gyro is driven by an electric motor. The deviations of the gyro from a predetermined initial position are measured by an angular movement, or by the relative angular movement between the stator and the rotor of a dynamo-electric induction element. In order to energize such detection elements and to transmit the generated signals therefrom, slip-ring structures are necessary, which include contacting brushes for the slip-rings to provide the necessary continuity to maintain the electric circuits between the windings of the dynamo-electric elements and the external sources of power and indicating equipment.

Since each terminal for the elements supported with and operated with the gyro requires its own slip-ring for connection to the external circuits, a slip-ring assembly may require six to twelve or more slip-rings with a corresponding number of contacting brushes.

Although the reduction in the diametral dimensions achieves a reduction in weight and in the friction, a critical problem was encountered in designing the brush assembly to maintain adequate insulation and separation of the brushes, and yet to permit a proper and continuous circuit contact to be maintained with slip-ring elements of minimum width for the ring structure and wide enough for the associated brush.

The primary object of this invention therefore is to provide a slip-ring and brush block assembly of minimum weight and dimensions, to be particularly suitable for use with the precision instrument gyroscope, wherein proper operation of the ring and brush assembly will be assured, with each relatively narrow brush guided and constrained on its own relatively narrow cooperating slip-ring.

Another object of this invention is to provide a simplified construction wherein the slip-ring unit of the assembly may be constructed as a simple shaft assembly which can be inserted in its proper bearing assembly, and then the brush rigging with its supported housing may be co-axially positioned over and onto the slip-ring assembly, with a direct co-axial movement, to position the brush block as a complete unit in proper position around the slip-ring unit.

The nature of the problem that is involved may be realized when the dimensions of the slip-ring and brush assembly are envisioned. Thus, the slip-ring diameter is on the order of 0.140 inch, while the width of the ring is about 0.020 inch, with a spacing between juxtaposed faces of the edges of rings about 0.015 inch, while the width of a brush as used with each slip-ring is about .0006 inch. Each brush for this application consists of a thin wire of white gold to provide extremely high conductivity and low resistance, with minimum physical friction against the slip-ring. The ring which is used here is made of fine silver with a light rhodium plate for minimum frictional resistance and maximum conductivity.

In order to maintain good contact between each brush and its associated slip-ring, the wire brush is bent into a substantially U-shaped element with the two side arms folded to a pre-determined spacing that is normally less than the diameter of a slip-ring. The two arms of the U-shaped wire brush element engage the opposite sides of a slip-ring and thus provide two points of contact to reduce the electrical resistance by such double contact, to balance the transverse forces on the shaft, and to provide assurance of electrical contact continuity between each slip-ring and its brush, irrespective of any accelerating forces that might tend to raise one brush from its ring.

The disposition of the brush and slip-ring assembly for one particular application of the assembly, and the particular design and construction in that assembly are particularly shown and described in the accompanying drawings, in which:

Figure 2 is an enlarged side view, partially in section and partially in elevation, showing the manner in which the ring supporting shaft is fitted and disposed in its bearing race ring;

Figure 3 is a vertical section through the brush block assembly, taken transversely to the central axis;

Figure 4 is a view similar to Figure 3 except showing only one half of the brush block assembly before it is assembled with its mating half into the full assembly shown in Figure 3;

Figure 1:
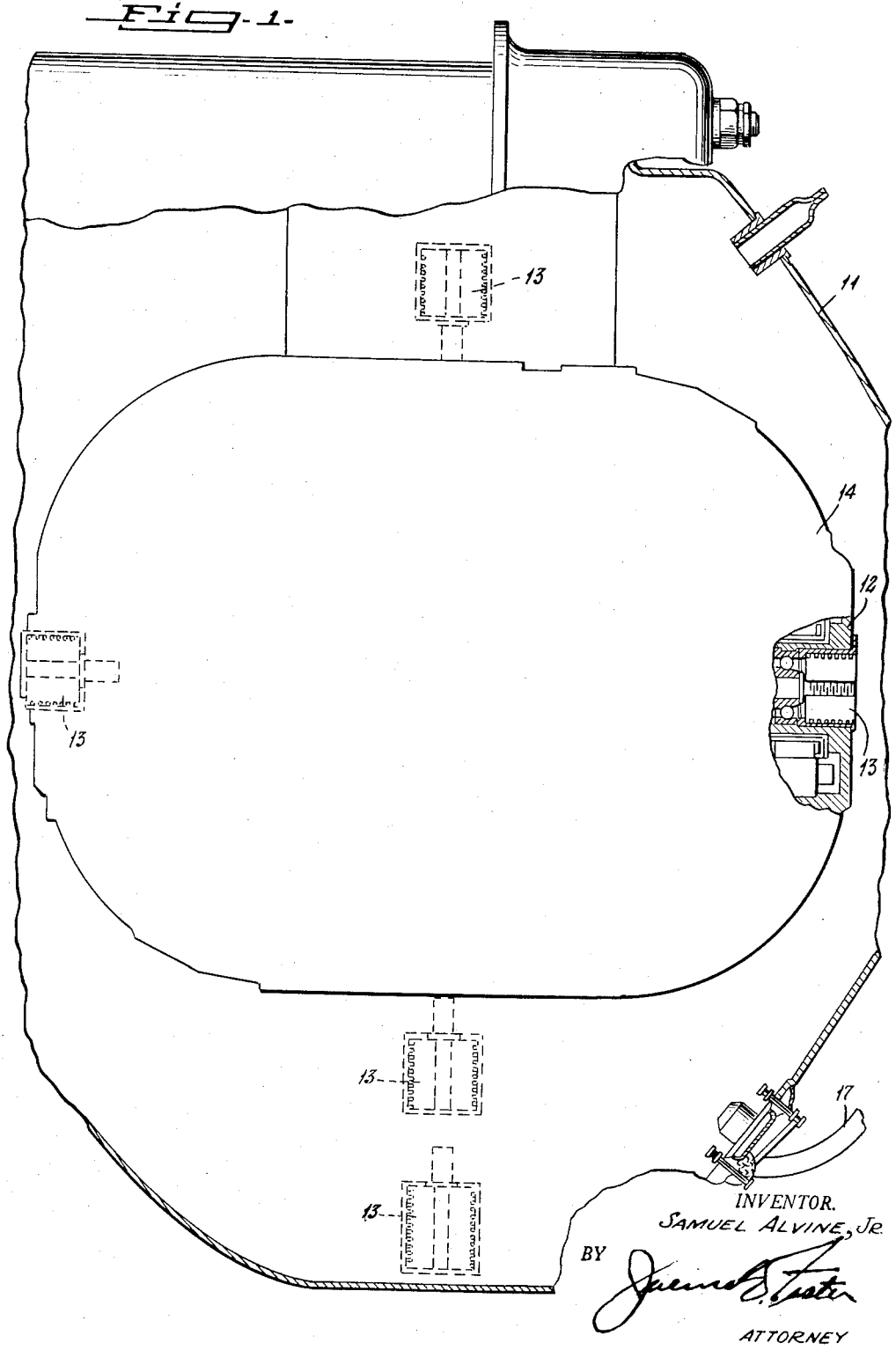
Figure 1 is a schematic side view of a gyroscope structure to which the slip-ring and brush assembly is applied, with portions broken away to show the locations of the slip-ring and brush assemblies.

A gyroscope housing 11, for a special application, is shown in contour outlined with a sufficient portion broken away to expose a recess within a housing portion 12 which is utilized to accommodate a slip-ring and brush block assembly 13. In a gyro where each gimbal may be provided with a signal take-off 14, or other electrical energy transducer, a similar slip-ring and brush assembly is provided for transferring electric power and signal currents between external circuits and those electrical elements within the housing 11, through suitable connections indicated by a conductor cable 17, whose conductors are connected to the respective brushes of the several brush block assemblies 13.

In Figure 2 is shown an enlarged side elevation of the slip ring structure. As there shown, a plurality of slip rings 20 are co-axially mounted on a hollow supporting shaft 21 with suitable insulation 22 between the shaft and the rings 20, and between the several rings themselves.

The supporting shaft 21 is shown as a stub shaft having a stub end 23 press fitted into a co-axial opening 24 in a concentric sleeve 25. The outer surface of sleeve 25 is formed to constitute and provide an inner raceway 26 for a row of ball bearings 27 riding in an outer race 26-a that serves to support the assembly of slip-rings 20 for free rotation within the associated brush block.

The stub end 23 of the shaft 21 is provided with a radial flange portion 28 which seats against the outer edge face 29 of sleeve 25, to position the ring supporting shaft 21 in proper axial position with respect to the outer edge 29 of that sleeve 25. The brush block 30 is externally supported co-axially in suitable position by a sleeve 31 that is otherwise suitably secured on the housing 12.

The brush block may then be suitably positioned with respect to the same outer edge 29 of the sleeve 25, in order to establish proper axial positioning between the brush block and the slip-rings 20.

In order to properly locate the inner end surface of the brush block 30, suitable shims 32 may be disposed between the inner edge surface 33 of the block-supporting sleeve 31 and the adjacent wall surface of the sleeve 31, to locate a positioning end ring 34 that serves as a limit stop for the brush block when the block is pressed into position within its supporting sleeve 31. The delicacy of the positioning problem, and the need for extreme accuracy, becomes apparent upon realization that the width dimension of each slip-ring 20 is only 0.020 inch and the spacing between adjacent edges of successive rings 20 is only 0.015 inch.

In view of all these very small dimensions, it becomes extremely important to establish and to maintain not only accurate dimensions in construction, but accurate disposition and spacing of the various elements in the assembly, and then to maintain such spacing under all conditions during operation.

One of the important features of this invention is the construction that is quite simple and yet highly effective in maintaining accurate positional relationship under all conditions of operation.

As previously indicated, this ring and brush block assembly will be employed in and mounted on gyroscopic devices intended for use in and on carriers such as airplanes, which may be subjected to various accelerating forces during operation.

Those accelerating forces may be likely to act upon the gyro assembly, and therefore upon the ring and brush block assembly, in any direction. One of the hazards that might result from such accelerating forces might be a separation of a brush from its slip-ring.

One of the features of this invention is a construction of brush and ring assembly which will provide a continuous circuit contact between a brush and its ring, notwithstanding the occurrence of any such accelerating forces.

Considered generally, each brush is a forked or U-shaped element with its arms disposed to engage the diametrically opposite sides of a slip-ring.

Thus, if an accelerating force should happen to act on the ring assembly and its brushes in such manner as to separate a ring and its engaging brush on one side of the ring, that same accelerating force will act upon the other arm of the forked brush to maintain even tighter engagement between the brush and its ring, while the first-mentioned arm on the other side of the ring is still separated from the ring.

The double engagement of each ring by its forked brush contact thus assures continuous contact between the ring and at least one brush that leads to the external circuit.

Each brush 40 consists of a wire element folded to constitute a forked or U-shaped body with a back or yoke 41 and two relatively long extending arms 42 and 43 that are respectively supported as cantilevers from the yoke 41.

The wire from which the brush 40 is constructed, is formed of a material to have a relatively low electrical resistivity and extremely high conductivity, with a relatively low coefficient of friction. For the present application, the wire 40 is formed of a ten-carat white gold with a spring temper to embody a relatively high degree of resiliency, and for this application is formed with a diameter of 0.006 inch.

In Figure 4 is shown how each wire brush 40 is supported. A supporting block 45 of relatively U-shape is formed to have a back or yoke 46 and side arms 47 and 48. On the front edge faces of the two side arms 47 and 48 is supported a rectangular guide plate 49, parallel to the axis 50 of the slip ring assembly. A similar block, not shown in Fig. 4, is mounted on the opposite side of the slip ring assembly.

The longitudinal dimension of the rectangular guide plate 49 is parallel to the main axis of the slip ring shaft to which the bearing brush is to be associated, and is designed to constrain the wire brush arms 42 and 43 in a plane transverse to said main axis 50.

For each wire brush 40 that is to be supported on the block 45, two holes 51 and 52 are provided in the yoke 46 of the block 45. The holes 51 and 52 are tapered convergingly forward to permit easy insertion of the brush arms, and to provide space to receive a thermo-plastic material to anchor the brush yokes in position on the block 45.

The block 45 has an outer contour that is relatively arcuate along a portion of a circle that is concentric with the main axis 50.

The block 45 is provided with several arcuate slots 53 in parallel planes, transverse to main axis 50, to provide a space recessed enough to accommodate a yoke 41 of a wire brush and a soldered terminal connection to be made thereto at an intermediate point 54, by a conductor lead 55, for connection to an external circuit.

Figure 6:
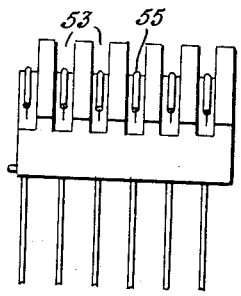
Figure 6 is a plan view of the single brush block of Figures 4 and 5, and is taken looking down on the block of Figure 5.
Figure 9:
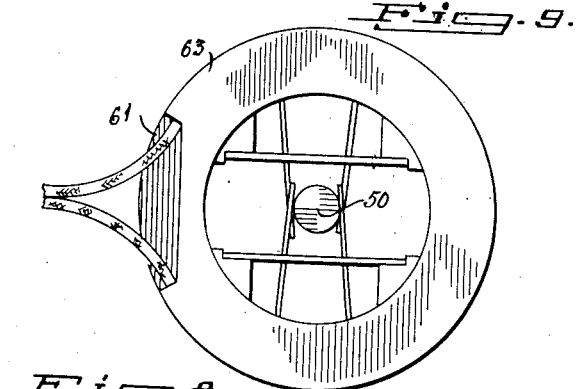
Figure 9 is an end view, in elevation, of the double brush block assembly of Figure 8.
Figure 7:
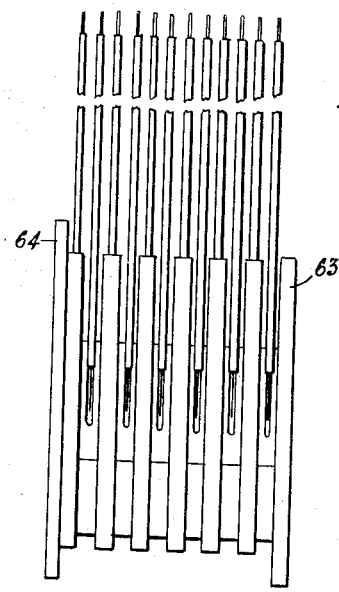
Figure 7 is a side elevational view taken from the outside of the brush block shown in Figure 3.
Figure 8:
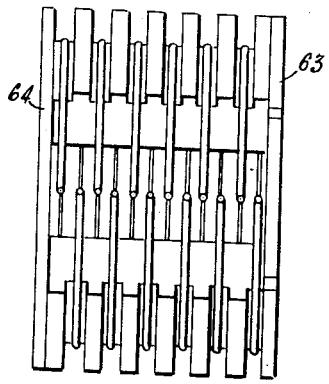
Figure 8 is a plan view showing the two brush blocks of Figure 3 in assembled position, and is taken looking down on Figure 7.

The general form and disposition of the slots 53 may be seen from the showings in Figures 4 and 6.

The two holes 51 and 52, in the yoke 46 of block 45, for accommodating the two side arms of one wire brush are formed or drilled to extend into the bottom of the slot space 53.

The common plane for the two holes 51 and 52 is transverse to the main axis 50, and co-incides with the median plane through the slip ring to be engaged by the brush to be supported in those two holes.

The spacing between the holes 51 and 52 is greater than the diameter of the slip ring which is to be engaged by the free ends or arms of the brush 40. The two holes 51 and 52 are therefore appropriately inclined to permit the preformed side arms 42 and 43 of the wire brush 40 to be unobstructed in their free movement for engagement with the slip ring circumference, when assembled on block 45. Before the brush block 45 is placed in position to cause the brushes to engage the slip rings, the two side arms 42 and 43 of each wire brush 40 will freely move toward each other to a self-spacing that is less than the diameter of a slip ring 20. That self-spacing dimension is predetermined in shaping the brush so the arms may be suitably stressed to control the pressure with which each wire arm 42 or 43 will normally engage the surface of its associated slip ring.

In assembling the wire brushes 40 on the block 45, the two arms of each brush are threaded into position through the openings 51 and 52. The terminal leads 55 will already have been soldered to the yoke 41 of each brush wire 40 at the point 54, as shown in Figure 4, and each wire brush and its conducting lead 55 will then be anchored in position on the brush block 45 by the application of a suitable thermo-plastic material 58, which will fill each slot 53 and the unfilled space in openings 51 and 52 to cover and anchor the yoke of each wire brush 40 in fixed position on the block 45.

In view of the relatively long side arms 42 and 43 of each wire brush 40, with each arm supported at a single point as a cantilever, each arm would normally have two degrees of freedom in movement that could result in an oscillation of either arm to an extent that would bring that arm into physical and electrical contact with either slip ring alongside its own.

Figure 5:
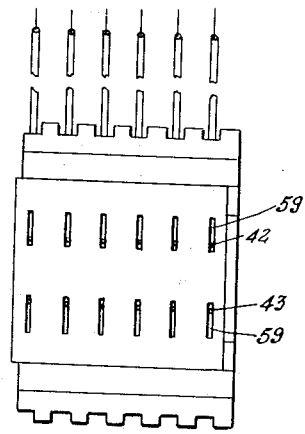
Figure 5 is an elevational front view looking into the single block unit shown in Figure 4, and illustrates the manner in which the slots in the guide plate serve to restrict and define the path of any radial oscillation of the brush wires.

In order to restrict the freedom of movement of each arm of each brush to its own slip ring, in accordance with the principle of this invention, one of the features of this invention is to provide a simple constraint in the form of a slot in the guide plate 49 for limiting each arm. As illustrated in Figures 4 and 5, the guide plate 49 is provided with a pair of aligned slots 59 for the respective side arms of each wire brush 40. During assembly of the guide plate 49 on its supporting block 45, the ends of the side arms 42 and 43 of each wire brush 40 are threaded through their respective guide slots 59, and are then restrained against any movement outside of their normal plane of operation, which insures that engagement of each brush arm with a slip ring will be restricted to the specific slip ring for which the brush is intended.

As shown in Figure 3, two brush blocks 45A and 45B are assembled to provide a complete symmetrical brush assembly. Figure 3 shows, also, the application of alternate brushes from the two blocks to successive slip rings of the slip ring assembly. Each main brush block 45A and 45B is applied with its own guide plate 49A and 49B to guide the respective associated brush wires supported by each of the two brush blocks.

Each brush block 45A and 45B, is provided with seating areas 60 to receive its respective guide plate 49A or 49B. The shoulders 61 adjacent the seating areas 60 aid in locating and confining the guide plate for assembly. When the guide plate 49A or 49B is to be placed in position on its brush block, the engaging surface areas are lightly covered with a suitable plastic cement, which serves to bond the guide plate to its brush block.

In order to hold the two brush blocks 45A and 45B in proper symmetrical positioning and spacing, with respect to the main shaft axis, the two blocks 45A and 45B are held together by two annular end rings 63 and 64. The front end ring 64 is cut out at its outer periphery to leave an opening 65 to permit the terminal conductors 55 to be brought out to a suitable terminal block for connection to external circuits.

The two brush blocks 45A and 45B, and their respective guide plates 49A and 49B, and the two annular end rings 63 and 64, are all formed from a suitable plastic or plasticized material which will permit them to be readily assembled as a unitary structure by the simple application of a plastic cement, with a suitable solvent or one having an appropriate thermo-plastic characteristic. Thus no external metal fastening members need be employed and the dimensions of the overall finished brush block assembly may be reduced to an absolute predeterminable minimum.

When the rings 20 are assembled and positioned and formed on their supporting shaft 21, the outer surfaces of the slip rings and of the insulating material between them are suitably machined to provide either a flat surface for the entire ring assembly, or the rings may be slightly undercut so the insulating material between them will serve not only as spacers but also as barriers. In either case the assembly of the brush block over the slip ring assembly is simplified by the use of a simple sleeve adapter temporarily placed over the slip ring shaft. The adapter may be formed to have a tapered nose or front end which will serve as a ramp to cause the outer ends of the brush wire arms to separate slightly so they may then move freely over the body of the adapter as the brush block assembly is axially moved into position.

Thus, by means of the simplified structure of the slip ring and wire brush assembly, an extremely small unit may be made to permit electrical connections to the control components on a gyroscope device, with the consequent advantages of extremely light weight and minimum dimensional space requirements, that permit the application of and disposition of the brush block in a space that would otherwise be inutilizable.

A further consequence and advantage of particular importance is that the other normal dimensions of the gyroscope device need not be increased merely to provide additional space needed for the ring and brush block assembly, as would otherwise be necessary if the extremely small dimensions of this device were not available to permit use of small spaces that could otherwise not be utilized.

The invention is not necessarily limited therefore to the particular design or construction that is illustrated, since variations may be made in the dimensional and constructional appearance without departing from the spirit and scope of the invention as set forth in the claims.

What is claimed is:

1. A brush block assembly unit of small dimension, constituting a self-contained assembly operable as a cartridge type unit, for use with a miniature slip-ring structure, said cartridge comprising a U-shaped wire element to serve as a two-arm brush to engage a slip-ring on two sides, with the back loop yoke to serve as an anchored support for the two side arms and the arms being spaced but biased toward each other to less than the diameter of the slip-ring; a brush block of insulating material to support the back loop yoke of the wire in anchored position with the side arms left free as cantilever elements to engage a slip-ring on opposite sides of the ring; and a guide strip anchored on the brush block and positioned close to the slip-ring, the strip having two narrow longitudinally aligned slots to confine and guide the two side arms of the wire to move in a fixed plane transverse to the slip-ring.

2. A brush block assembly as in claim 1, in which the brush block is provided with a single groove to receive and locate and seat the wire back loop portion with limited free movement; and a thermo-plastic bonding agent to fill the groove and thereby anchor the wire back loop in fixed position.

3. A brush block as in claim 2, including a terminal wire electrically secured to said back loop and covered by said plastic bonding agent to be anchored in position against casual movement that would disturb the operative positioning of the wire side arms relative to the associated slip ring.

4. A brush block assembly as in claim 1, in which the brush block is of U-shape with its yoke supporting the yoke of the wire and its side walls supporting the guide strip in fixed position.

5. A cartridge type brush block and slip ring assembly for use on a slip ring structure mounted on a metallic shaft, on which a plurality of spaced rings of conducting material are supported in spaced co-axial relation on the shaft and are insulated therefrom and from each other; the brush block being assembled as a cartridge type unit to fit over the slip rings, said brush block unit embodying a body of insulating material, a plurality of U-shaped wires supported thereon to straddle and engage the respective slip rings, each of said wires serving as a two arm brush to engage the slip ring on two sides, each of said brush wires having an integral back loop yoke to serve as an anchored support for the two side arms, the side arms being spaced but biased toward each other to less than the diameter of the slip ring, and a guide strip anchored on the brush block and positioned close to the slip ring, the guide strip having pairs of longitudinally aligned slots in substantial alignment with each pair of wire arms, the slots being operative to confine and guide the two side arms of the corresponding wire to move in a fixed plane transverse of the slip ring.

6. A brush and slip ring assembly as in claim 5, in which two brush blocks are disposed in oppositely facing positions, and the wires in the two blocks are disposed to alternately engage successive rings in sequence.

7. A brush and slip ring assembly as in claim 6, in which the two brush blocks are interchangeable and dimensionally equivalent; and including two co-axial end rings of insulating material supported on and secured to the two blocks for holding the two blocks in fixed position symmetrically about the axis of the slip ring shaft.

8. A brush block assembly unit of small dimension for use with a slip ring structure, comprising a pair of oppositely facing U-shaped blocks to straddle an axis of rotation, and to support oppositely facing brush elements, each of said brush elements comprising a U-shaped wire adapted to serve as a two arm brush to engage a slip ring on two sides, and the arms being spaced but biased toward one another to less than the diameter of the slip ring, to enhance the pressure of each of said arms against the corresponding slip ring, each of said brush blocks being adapted to support the U-shaped wire in anchored position with the side arms left free as cantilever elements, to engage a slip ring on opposite sides of the ring, a guide strip anchored on each of the brush blocks and positioned close to the slip ring, the guide strip having pairs of longitudinally aligned slots therethrough, each pair of slots being operative to confine and guide the two side arms of the corresponding wire to move in a fixed plane transverse to the slip ring and a pair of co-axial substantially circular end rings to be substantially concentric with said axis and cemented to the end surfaces of the two U-shaped blocks to hold the two blocks in a rigid integrated assembly.

References Cited in the file of this patent

UNITED STATES PATENTS

| | | |
|---|---|---|
| 2,242,273 | Taylerson | May 20, 1941 |
| 2,288,259 | Gladulich | June 30, 1942 |
| 2,473,526 | Hood et al. | June 21, 1949 |
| 2,563,116 | Hultgren | Aug. 7, 1951 |
| 2,696,570 | Pandapas | Dec. 7, 1954 |